(12) United States Patent
Finarov

(10) Patent No.: US 6,806,971 B2
(45) Date of Patent: Oct. 19, 2004

(54) METHOD AND APPARATUS FOR PROCESS CONTROL IN SEMICONDUCTOR MANUFACTURE

(75) Inventor: Moshe Finarov, Rehovot (IL)

(73) Assignee: Nova Measuring Instruments Ltd., Rehovot (IL)

(*) Notice: Subject to any disclaimer, the term of this patent is extended or adjusted under 35 U.S.C. 154(b) by 144 days.

(21) Appl. No.: 10/155,236

(22) Filed: May 28, 2002

(65) Prior Publication Data

US 2003/0030822 A1 Feb. 13, 2003

(30) Foreign Application Priority Data

Aug. 8, 2001 (IL) .............................................. 144806

(51) Int. Cl.[7] .............................................. G01B 11/08
(52) U.S. Cl. ..................... 356/636; 356/630; 356/237.5; 250/339.08; 250/339.11; 250/559.27
(58) Field of Search ......................... 356/237.1–237.5, 356/640, 625–636, 300–306, 326, 328, 73; 250/339.08, 339.11, 559.27, 237 G, 231.16

(56) References Cited

U.S. PATENT DOCUMENTS

| | | | |
|---|---|---|---|
| 4,845,373 A | * 7/1989 | Jamieson et al. | ............ 250/548 |
| 4,868,385 A | * 9/1989 | Nishimura | ............. 250/231.16 |
| 5,026,985 A | * 6/1991 | Ishizuka et al. | ....... 250/231.16 |
| 5,369,486 A | * 11/1994 | Matsumoto et al. | ........ 356/488 |
| 5,604,344 A | 2/1997 | Finarov | |
| 5,625,453 A | * 4/1997 | Matsumoto et al. | ........ 356/488 |
| 5,682,242 A | 10/1997 | Eylon | |
| 5,751,320 A | * 5/1998 | Scheffelin et al. | ............ 347/85 |
| 5,751,426 A | * 5/1998 | Nose et al. | ................. 356/488 |
| 5,764,365 A | 6/1998 | Finarov | |
| 5,867,590 A | 2/1999 | Eylon | |
| 5,900,633 A | * 5/1999 | Solomon et al. | ........ 250/339.08 |
| 5,909,276 A | * 6/1999 | Kinney et al. | ........... 356/237.2 |
| 6,100,985 A | * 8/2000 | Scheiner et al. | ............ 356/630 |
| 6,166,801 A | * 12/2000 | Dishon et al. | ................ 355/27 |
| 6,327,035 B1 | * 12/2001 | Li et al. | ..................... 356/432 |
| 6,587,193 B1 | * 7/2003 | Reinhron et al. | ........ 356/237.5 |

FOREIGN PATENT DOCUMENTS

| | | |
|---|---|---|
| JP | 2307048 | 12/1990 |
| JP | 4319609 | 11/1992 |
| WO | WO 00/12958 | 3/2000 |
| WO | WO 01/13098 A1 | 2/2001 |

\* cited by examiner

Primary Examiner—Gregory J. Toatley, Jr.
Assistant Examiner—Sang H. Nguyen
(74) Attorney, Agent, or Firm—Browdy and Neimark, P.L.L.C.

(57) ABSTRACT

An optical system is presented for use in a measurement system for measuring in patterned structures, which is particularly useful controlling processing of the structure progressing on a production line. The system comprises an illuminator unit producing illuminating light to be directed to the structure to produce returned light, a detector unit comprising an imaging detector and a spectrophotometer detector, and a light directing assembly. The light directing assembly defines first and second optical paths for the light propagation. The optical elements accommodated in the first optical path affect the light to provide a relatively small measuring area of the structure's plane. The second optical path is located outside the first optical path, the light propagation through the second optical path providing a relatively large measuring area, as compared to that of the first optical path.

10 Claims, 3 Drawing Sheets

METHOD AND APPARATUS FOR PROCESS CONTROL IN SEMICONDUCTOR MANUFACTURE

FIELD OF THE INVENTION

The present invention is generally in the field of optical monitoring techniques, and relates to the control of semiconductor processing by measuring parameters of thin films, e.g. within processing equipment (the so-called "integrated metrology").

BACKGROUND OF THE INVENTION

Optical methods for on-line or integrated measurement of the parameters of dielectric films (e.g., film thickness) are known in the art. Most of these techniques are based on reflectometry in broaden spectral range, e.g. from DUV to NIR spectral range.

The NanoSpec 9000 spectrophotometric device commercially available from Nanometrics Inc., USA (that is installed on the CVD production cluster tool Producer commercially available from Applied Materials, USA) utilizes a configuration that allows measurements of a wide range of dielectric films just after deposition within the CVD cluster tool before a processed wafer goes to an out-put cassette. The device includes a measuring tool installed in a load/unload block, outside a vacuum part of the cluster tool. This configuration suffers from that it applies measurements to a wafer a certain time after the wafer moves out of a reaction deposition chamber. During this time period, which is needed for transferring the wafer within the vacuum part of the cluster tool and out of this vacuum part towards the cassette block, other wafers of the lot pass through the deposition chamber. This time delay impedes appropriate control of the manufacturing process. Actually, in case of malfunction or drift effect in the deposition process, measurements by a tool located out of the vacuum environment of the CVD tools arrangement will recognize this effect with a certain delay, and wafers of the lot processed after the first measured wafer will be scrapped.

Another technique is used in the NovaScan 840 integrated measuring tool, commercially available from Nova Measuring Instruments Ltd. According to this technique, a station (integrated metrology tool) installed on the CVD cluster tool as a separate vacuum chamber, or a non-operated chamber of the cluster tool is used for measurements. This is implemented by locating a measuring optical system outside the vacuum environment and separated therefrom by an optical window made in the respective chamber. The optical system utilizes a spectrophotometric measuring unit that measures the thickness of a deposited film through the optical window without affecting the deposition process. The measurements are performed on predetermined measuring sites in the wafer with a relatively small illuminating/measuring spot. The typical spot size used in the system is about 15–20 μm in diameter. This configuration allows recognizing process deviations just after the first processed wafer is transferred from the processing area or chamber to the measuring area (chamber) and is measured by the integrated metrology tool. Such a fast response allows for "on-line" process controlling and correcting the processing parameters for the next wafer to be processed or to stop the processing at all if needed prior to processing the next wafer.

Since the above system utilizes a relatively small measuring spot and performs measurements on the predetermined sites, it requires precise positioning of the optical system relative to the wafer under measurements, as well as pattern recognition and auto-focusing techniques. A precise positioning means is used to locate the small spot on the predetermined test site using a predefined optical model (properties of all or at least some of the underneath layers of the wafer). Knowledge of the optical model allows accurate and unambiguous interpretation of the measured reflectance spectrum. However, this system suffers from the need for a time consuming alignment (e.g. pattern recognition, auto-focusing, and precise positioning) and additional operations or steps within the cluster tool associated with the wafer handling by an internal cluster robot that might affect the cluster tool operation sequence and its throughput, especially in case of deposition of very thin films with short deposition time and respectively with high throughput of the cluster tool.

Still another approach for integrated measurements of the films' thickness, particularly applicable to vacuum processing tools, consists of using a relatively large measuring spot (e.g., PCT publication No. WO00/12958 in the name of TEVET, or U.S. Pat. No. 5,900,633 in the name of On-Line Technologies Inc.). Such a technique does not require any pattern recognition, auto-focusing, precise positioning of a wafer, and/or movement of the optical system. Thus, the entire measuring cycle may be sufficiently reduced in order not to affect the throughput of the processing tool. Moreover, this technique provides measurements carried out during the wafer transfer from one location to the other within the processing (e.g. cluster) tool.

Measurements with a relatively large spot are implemented by averaging reflected light from a relatively large wafer's area (e.g. of a diameter d=20–30 mm), i.e. slightly larger than the typical diagonal size of a die. Interpretation of the measured data is significantly different from that utilized in the above-indicated small light spot based technique (e.g. 15–20 μm). Averaging of reflections from different elements of the wafer pattern within a large light spot covering different optical stacks with unknown weighting makes spectrum analysis and data interpretation very difficult, especially in those cases where there is a number of underlying layers in the wafer. Such a technique in case of multi-stack structures suffers from low confidence and low accuracy. In some cases, the contribution of the measured top layer within the relevant stack is so small that the measured reflectance spectrum is practically insensitive to this layer and cannot be measured with desired accuracy.

SUMMARY OF THE INVENTION

There is accordingly a need in the art to facilitate optical measurements of parameters of a patterned structure, such as a semiconductor wafer, by providing a novel optical system enabling measurements with measured areas of different sizes.

The main idea of the present invention consists of combining the advantages of both "large-spot" and "small-spot" approaches. By integrating a measurement system of the present invention with a processing tool, the accurate thickness measurements of a wafer's layer(s) can be provided with minimal effect on the throughput of a processing tool.

There is thus provided according to one broad aspect of the present invention, an optical system for use in a measurement system for measuring in patterned structures, the system comprising:

(i) an illuminator unit producing an illuminating beam of light to be directed to the structure to produce a light beam returned from the structure;

(ii) a detector unit comprising an imaging detector and a spectrophotometer detector; and (iii) a light directing assembly for directing the illuminating beam to the structure and directing the returned beam to the detector unit, the light directing assembly defining a first optical path for the light beams propagation, optical elements accommodated in the first optical path affecting the light beam to provide a relatively small measured area, and a second optical path outside said first optical path, such that the light beams propagation through the second optical path provides a relatively large measured area, as compared to that of the first optical path.

The term "measured area" used herein signifies a region on the structure's plane as viewed by the detector. This measured area is defined by the properties of the light directing optics and the sensitive area of the detector. The terms "small spot operational/measurement mode" and "large spot operational/measurement mode" signify system operations with, respectively, relatively small and large measuring areas.

In one embodiment of the invention, the optical elements in the first optical path include an objective lens that focuses the illuminating beam onto the structure, while the second optical path is defined by an optical arrangement that is accommodated upstream of the objective lens with respect to the direction of the illuminating beam propagation towards the structure's plane, and is shiftable between its operative position being in the optical path of the light beam propagating towards the objective lens and inoperative position being outside the path of the light beam propagating towards the objective lens. Hence, when the optical arrangement is in its operative position, it directs the illuminating beam (and returned beam) to propagate along the second optical path aside the objective lens, thereby providing a relatively large measured size, and when the optical arrangement is in its inoperative position, the illuminating beam (and returned beam) propagates through the objective lens, thereby resulting in a smaller measured area.

Preferably, the optical arrangement comprises first and second spaced-apart mirrors facing each other by their reflective surfaces. The first mirror is mounted stationary aside the objective lens, and the second mirror is movable between its inoperative position being outside the optical path passing through the objective lens and its operative position being inside said optical path. The optical arrangement may additionally comprise a beam-expanding unit accommodated in the path of a light beam reflected from the first mirror.

In another embodiment of the invention, the optical system comprises at least two optical sub-systems, either utilizing a common illuminator and/or detector or not, wherein one sub-system is designed to provide a smaller measured area, and at least one other sub-system is designed to provide a larger measured area.

There is thus provided according to another broad aspect of the present invention, an optical system for use in a measurement system for measuring in patterned structures, the system comprising:

(i) an illuminator unit producing an illuminating beam of light to be directed to the structure to produce a light beam returned from the structure;

(ii) a detector unit comprising an imaging detector and a spectrophotometer detector; and (iii) a light directing assembly for directing the illuminating beam to the structure and directing the returned beam to the detector unit, the light directing assembly defining a first optical path for the light beam propagation, optical elements accommodated in the main optical path affecting the light beam to provide a relatively small measured area, and a second optical path outside said first optical path, such that the light beam propagation through the second optical path provides a relatively large measured area, as compared to that of the first optical path.

According to yet another broad aspect of the present invention, there is provided a processing tools arrangement comprising a processing tool defining a processing region, and an integrated measurement system having the above-described optical system associated with a region within the processing tools arrangement outside said processing region.

The present invention also provides according to its yet another aspect, a method for controlling a process applied to a patterned structure progressing on a production line, the method comprising selectively applying optical measurements to at least one predetermined site on the structure with measured area of different sizes.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
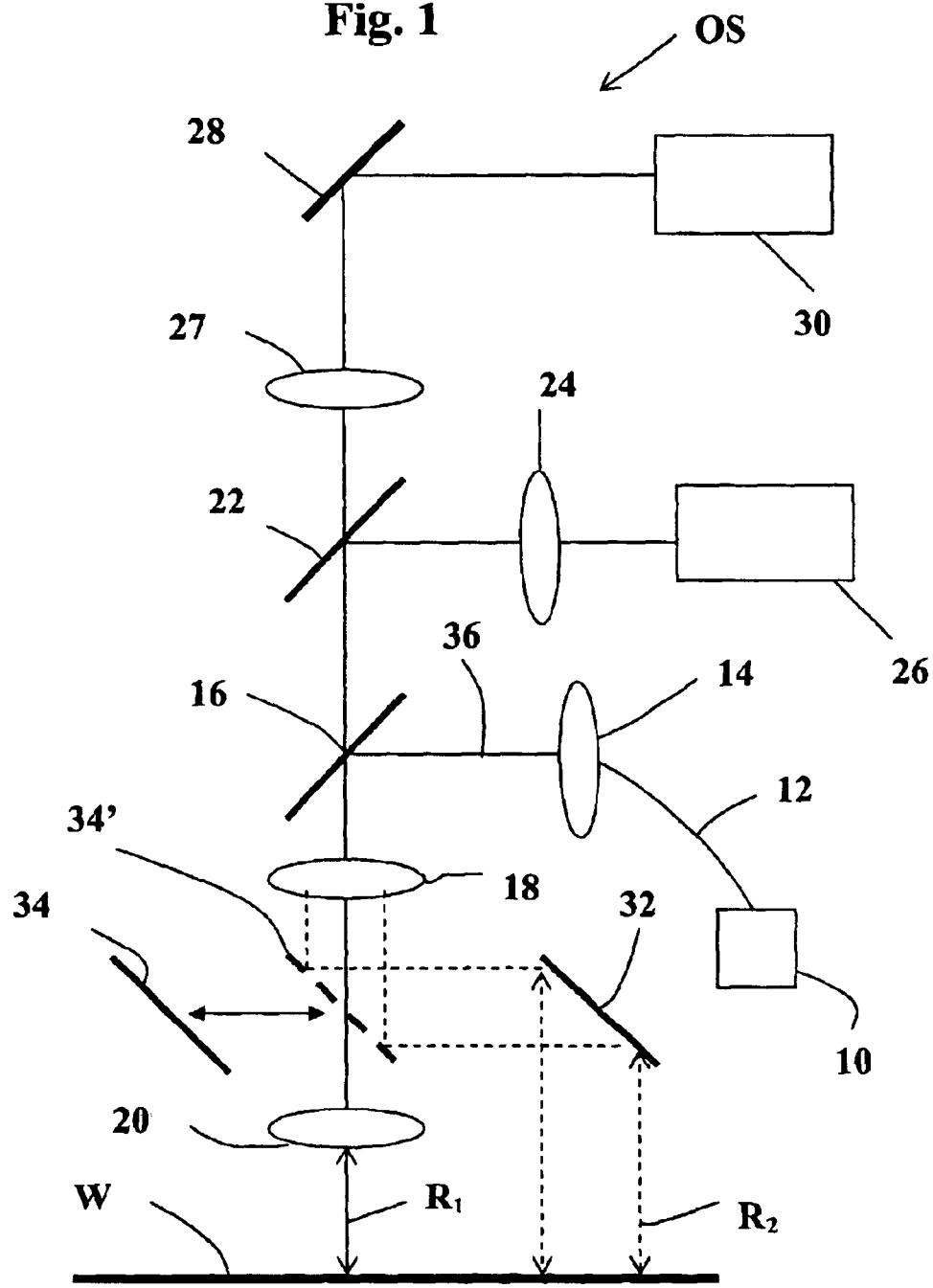
FIG. 1 schematically illustrates an optical system according to one embodiment of the present invention, combining "small spot" and "large spot" operational modes in a common light directing assembly.

Referring to FIG. 1, there is illustrated an optical system, generally designated OS, according to one embodiment of the invention, applied to a wafer W. The system OS comprises a broad-band (white) light source 10, an imaging detector 26 (CCD camera) the provision of which is optional, a spectrophotometer 30, and a light directing assembly, generally at 31. As will be described more specifically further below, the light directing assembly is operable so as to selectively provide "large spot" or "small spot" measurement modes.

The light directing assembly 31 defines an illumination channel for the propagation of light produced by the light source to the wafer's plane, and a light detection channel for the propagation of light returned from the wafer to the detectors 26 and 30, and defines two optical paths for illuminating and returned beams propagation, a first optical path for realizing the "small spot" operational mode and the second optical path for realizing the "large spot" operational mode. Optical elements of the assembly 31 accommodated in the illumination channel include a condenser lens 14 optionally connected to the light source via an optic fiber 12; a beam splitter 16; a tube lens 18; and an objective lens 20 that may and may not be translatable. A pinhole mirror 22 located at the other side of the beam splitter 16 and a relay lens 24 define the light detection channel part associated with the CCD camera 26. Another relay lens 27 and optionally a mirror 28 define the detection channel part associated with the spectrophotometer 30. All the above elements define the optical path for spectroscopic measurements with a small measuring area ("small-spot" operational mode), as used for example in the NovaScan 840 ITM, commercially available from Nova Measuring Instruments, Rehovoth, Israel. Preferably, only the objective lens 20 along with the light beam deflecting element, such as a beam-splitter or mirror (not shown) is translated in the X-Y plane parallel to the wafer's plane in combination with mirrors deflecting the collimated light beam along X and Y axes (see U.S. Pat. No. 5,764,365 assigned to Nova Measuring Instruments. Ltd.). Also, the wafer W may be moved relative the optical system OS; the movement may be carried out by X, Y or R-Θ stage or any other two-coordinate motion system.

Further provided in the light directing assembly 31 of the optical system OS is an optical arrangement including mirrors 32 and 34, wherein mirror 32 is stationary mounted and mirror 34 is movable between its inoperative and operative positions 34 and 34' (shown in dashed line) to be, respectively, out of and in the optical path passing through the objective lens 20. Any suitable drive (not-shown) can be used, being operated by a control unit (not shown), for providing the movement of the mirror 34, e.g. reciprocal, rotating, tilting, etc. Generally speaking, this optical arrangement of the light directing assembly provides selective propagation of the illuminating and reflected light beams through the first optical path passing through the objective lens 20, or through the second optical path that does not pass through the objective lens 20. The mirrors 32 and 34, when in the operative position of the mirror 34, direct a wide collimated light beam to the wafer W along the second optical path without the beam passage through the objective lens 20, thus providing spectroscopic measurements with a relatively large measuring area ("large-spot" operational mode of the system 10). The system 10 thus can operate with two operational modes, i.e., with relatively small and large illuminating spots.

In the "small spot" operational mode, the mirror 34 is outside the first optical path, and the system operates in the following manner. The beam splitter 16 reflects a light beam 36 emanating from the light source 10 towards the wafer W via lenses 18 and 20. The objective lens 20 focuses the illuminating light beam 36 onto the wafer surface W. A reflected light beam $R_1$ is collected by the objective lens 20 and further transmitted by the lens 18 and the beam splitter 16 to the CCD camera 26 via reflective regions of the pinhole mirror 22 (outside the pinhole opening) for image acquisition procedure. It should be understood, although not specifically shown, that the output of the CCD camera 26 and of the spectrophotometer 30 are connectable to a control unit having suitable data processing and analyzing utilities for determining the wafer's parameters, particularly the thickness of one or more layers in the wafer. More specifically, the output of the CCD indicative of the acquired image of the illuminated site is processed by an image processor to identify the illuminated location on the wafer W and thereby enable measurements in predetermined sites of the wafer having known optical stack(s) (model). A portion of the returned light beam passes through the central opening in the pinhole mirror 22 and reaches the spectrophotometer 30. This light portion is used for spectroscopic measurements. In the "small spot" operational mode of the system, the measuring area on the wafer surface is defined inter alia by the pinhole size and optical magnification produced by lenses 20 and 18 and preferably is in the range of 10–20 μm.

In the "large spot" operational mode, the mirror 34 is shifted into its operational position being in the first optical path. As a result, the light beam 36 propagating from the light source 10 and directed toward the wafer W by the beam splitter 16 and the tube lens 18 which forms the collimated beam, is reflected by the mirror 34 to propagate along the second optical path towards the mirror 32, and thus does not pass through the focusing lens 20. The mirror 32 reflects the illuminating beam to the wafer's plane. Consequently, the illuminating beam provides an illuminating spot of a relatively large size (preferably, of the typical die size in the measured wafer). A light beam $R_2$ returned from the larger-size illuminated spot is sequentially reflected by the mirrors 32 an 34, and is then sequentially transmitted through the lens 18, beam splitter 16 and the central opening of the pinhole mirror 22 to reach the spectrophotometer 30 for spectroscopic measurements. In order to increase an input signal of the spectrophotometer 30 in the "large spot" operational mode, the pinhole mirror 22 might be re-moved out of the optical path. In that case, the pinhole mirror 22 is movable to be out of or in the main optical path. If the pinhole mirror 22 is removed from the optical path, the spot size (i.e. measuring area) on the wafer surface is defined by the optical magnification produced by the lens 27, diameter of the lens 18, and by the size of detector's active area.

The present invention can be used with the NovaScan 840 ITM model, or any other Integrated Technology Measurement (ITM) tool, which operates with an image acquisition system for applying measurements through an optical window in a separate vacuum chamber or inoperative chamber of a cluster tool, as well as any other production tool. Additionally, the optical system of the present invention may comprise an auto-focusing sub-system, preferably of a dynamic type, described for example in the U.S. Pat. No. 5,604,344 assigned to the assignee of the present application. The optical system of the present invention may utilize an alignment technique based on the pattern recognition, for example described in the U.S. Pat. Nos. 5,682,242 and 5,867,590 assigned to the assignee of the present application. The auto-focusing and alignment techniques do not form part of the present invention and therefore need not be specifically described.

It should be noted that in the "large spot" operational mode of the system, such procedures as alignment, pattern recognition, and precise positioning of the beam on the wafer's surface, are not needed. Accordingly, the measurement time is reduced to minimal, e.g. about 0.1–0.5 sec per measurement point, and measurements do not affect the throughput of the processing tool provided with an integrated measuring system utilizing the optical system OS.

Figure 2:
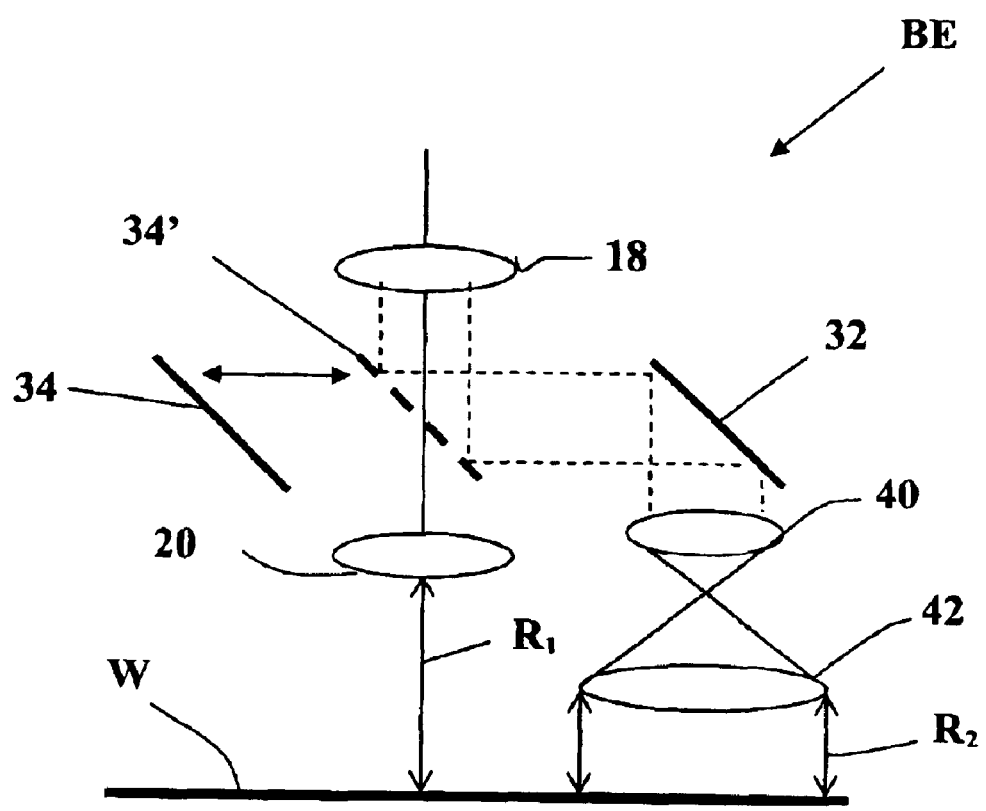
FIG. 2 more specifically illustrates a beam expanding unit suitable to be used in the system of the present invention for implementing the "large spot" operational mode.

Reference is made to FIG. 2 illustrating a beam expanding unit BE suitable to be used as part of the light directing assembly in the above-described system OS to provide a desirably large spot size regardless of the size of the light beam formed by the lens 18. To facilitate understating, the same reference numbers are used for identifying the common elements in the light directing assembly 31 in FIG. 1 and the beam-expanding unit BE. The beam expanding unit BE comprises the tube lens 18, mirrors 32 (stationary mounted) and 34 (movable), and comprises two additional lenses 40 and 42 accommodated in the path of the illuminating beam downstream of the mirror 32. The lenses 40 and 42 are designed to expand the light beam (having, for instance, a 10 mm diameter) to provide a measuring area of about 20–25 mm diameter.

Figure 3:
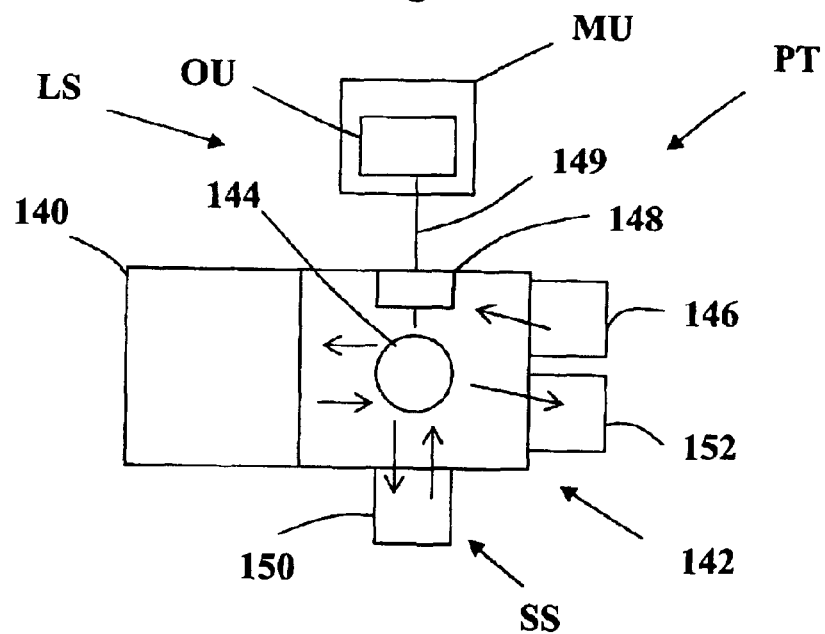
FIG. 3 schematically illustrates a processing tool utilizing an integrated measurement system using the optical system of the present invention according to another embodiment, where the "small spot" and "large spot" operational modes are implemented by two separate sub-systems, respectively.
Figure 4:
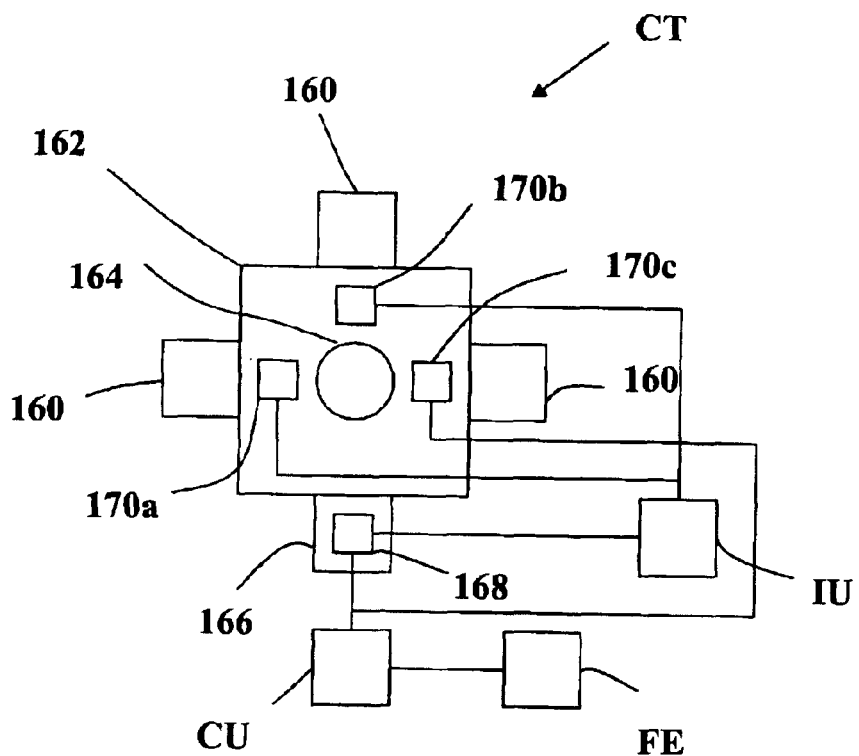
FIG. 4 schematically illustrates a cluster processing tool utilizing an integrated optical measurement system using the optical system of the present invention according to yet another embodiment of the invention, where the "small spot" operational mode is implemented by one sub-system and the "large spot" operational mode is implemented by several other sub-systems.

Turning now to FIGS. 3 and 4, there are illustrated two more examples, respectively, of the present invention using "large spot" and "small spot" operational modes implemented using separate optical sub-systems LS and SS. Here, the optical system of the invention forms a part of an integrated measurement system.

In the example of FIG. 3, the present invention is used for controlling a process of Chemical Mechanical Planarization (CMP). A CMP processing tool (polisher), generally designated PT, includes a processing (polishing) area 140, and an exit station 142 having a transferring unit (e.g. robot) 144 for transferring a wafer from an input cassette 146 to the processing area 140 for polishing, and for transferring the polished wafer to an output cassette 152. An optical system of the present invention consists of a "large spot" optical sub-system LS and a "small spot" optical sub-system SS. The same robot 144 is used for transferring the wafer located inside the exit station 142 to measurement positions with respect to sub-systems LS and SS. The "large spot" sub-system LS, or only the detecting part thereof 148, is preferably installed within the exit station 142 and provides preliminary measurements (before processing) on the wafer to be polished during the wafer transfer from the input cassette 144 to the processing area 140 by the robot 144. In the present example, the detecting part 148 of the sub-system LS is connected to an optical unit OU of an external measuring unit MU via an optical fiber 149. The information about the thickness of a top layer of a wafer to be processed can be used for fitting the working parameters of the polisher, e.g. polishing time. After being polished, the wafer is supplied by the robot 144 to the measurement position of an optical system 150 of the "small spot" sub-system SS located adjacent to the exit station 142 (may be mounted inside the exit station or at the location of the output cassette or adjacent thereto). The sub-system SS carries out thickness measurements, and the measurement results are used to provide a close loop control of the polishing process within the current lot of wafers. Information on the actual parameters of the processed wafer in addition to pre-polishing thickness information provide a dedicated process control within the current lot of wafers. After being measured, the wafer is transferred from the "small spot" measuring sub-system SS to the output cassette 152. As will be described further-below, the "small spot" measurement sub-system SS may be used for calibration of the "large spot" measurement sub-system LS by performing preliminary "calibration" measurement or measurements on at least the first wafer of the lot.

In the example of FIG. 4, the present invention is used for controlling a process of Chemical Vapor Deposition (CVD), or Physical Vapor Deposition (PVD) or etching. The CVD tools arrangement is typically a vacuum based cluster tool CT comprising several processing chambers 160 (three such chambers in the present example), a transferring chamber 162 with a transferring unit (internal robot) 164 and a non-operative chamber 166. In the present example, the optical system comprises a "small spot" sub-system 168 and several "large-spot" sub-systems—three such sub-systems 170A, 170B and 170C in the present example.

The sub-system 168 is preferably associated with the non-operative chamber 166 (measuring chamber), in a manner allowing measurements without breaking the vacuum conditions of the entire cluster tool CT. Preferably, the optical arrangement (not shown here) of the measurement sub-system 168 is located outside the vacuum chamber 166 and measurements are carried out through a transparent optical window made in the chamber 166. During the measurements, the wafer is handled by a suitable handling unit (e.g. rotatable or static chuck). The "large-spot" measurement sub-system or systems may be installed within the transfer chamber 162, adjacent to the processing chambers 160 in order to perform measurements to the just processed wafer and therefore without affecting the throughput of the entire cluster tool. As shown on FIG. 4, all the sub-systems 168 and 170A–170C may be implemented as totally separate units, with a common processing unit CU and front end FE, contrary to the above-described system having common opto-electrical components. In the present example, the measurement system utilizes a common external illuminating unit W for all the optical sub-systems. A corresponding number of separate spectrophotometric units may be used, or alternatively the sub-systems may use some common components, e.g. a spectrophotometer with appropriate separate optical systems. For example, the "large spot" sub-system may use optical fibers for transmitting illuminated and reflected light to and from the location within the processing tool, e.g. inside the transferring chamber, etc. The "small spot" sub-system is preferably installed within an exit station (interface) of the processing (cluster) tool. Single or multiple "large spot" sub-systems may be located in other parts of the processing equipment e.g., in the vicinity of a place to which the wafers are brought from the in/out cassette.

For most of wafers in the lot (usually, 25 wafers per lot), a proper process control may be carried out by measuring in a few points or even in a single (central) point of the wafer. Thus, a total effect on the processing tool throughput will be negligible. The measurements may be applied to the wafer while held on a robotic arm (end-effector during its movement within the cluster, so no additional wafer's handling is needed).

The important advantage of a "combined" measurement system in accordance with one aspect of the present invention (see FIGS. 1 and 2) is the possibility of carrying out measurements in both the "large spot" and the "small spot" operational modes on the same wafer, without additional transferring the wafer into another measuring location. The "small spot" mode provides accurate measurements of the thickness of a top layer for any application (on any multilayer stack). A combined measurement may be performed in the following manner. Having performed the "small spot" measurement on a predetermined site with the known optical model and calculated the thickness of the top layer, the "large spot" measurement is applied to the same location on the wafer. Data indicative of the actual thickness of the top layer obtained from the "small spot" measurement can be used for optimizing the "large spot" spectrum processing, e.g., by choosing (or verifying) the appropriate spectrum interpretation algorithm. It should be noted that the order of measurements, i.e. which of the two mode is used first, is not important for measurements, because the data interpretation may be carried out after both measurements (with both operational modes) have been completed. Actually, such a technique presents verification or calibration of the chosen interpretation algorithm for the "large spot" operational mode. In the case when there is no algorithm providing acceptable results (information on the top layer is lost due to averaging the signal within the large spot), it would be still possible by using only the "small spot" mode. When the "large spot" mode provides sufficient results, both modes may be combined. For example, the first wafer may be measured using both modes and the rest wafers in the lot (or most of them) may be measured using the "large spot" mode only.

The known frequency decomposition technique (Fourier Transform) can be applied for the interpretation of the measured spectra. In this case, a specified frequency (or frequencies window/(s)) corresponding to the top layer thickness may be obtained from the "small spot" mode measurement. This frequency, with a certain tolerance, is further used as a filter for extracting the useful data about the top layer thickness from a number of harmonic signals received as a result of the Fourier decomposition. This method ensures confident result even when the original spectrum includes a number of harmonic signals related to the light reflection from non-relevant layers or layer stacks.

Those skilled in the art will readily appreciate that various modifications and changes can be applied to the embodiments of the invention as hereinbefore exemplified without departing from its scope defined in and by the appended claims.

What is claimed is:

1. An optical system for use in a measurement system for measuring in patterned structures, the system comprising:
   (i) an illuminator unit producing an illuminating beam of light to be directed to the structure to produce a returned light beam,
   (ii) a detector unit comprising an imaging detector and a spectrophotometer detector; and
   (iii) a light directing assembly for directing the illuminating beam to the structure and directing the returned light beam to the detector unit, the light directing assembly defining a first optical path for the light beam propagation, optical elements accommodated in the first optical path affecting the light beam to provide a relatively small measuring area, and a second optical path outside said first optical path, such that the light beam propagation through the second otical path provides a relatively large measuring area, as compared to that of the first optical path,
   wherein
      the optical elements installed in the first optical path comprise an objective lens that focuses the illuminating light beam onto the structure's plane and collects the returned beam,
      the second optical path is defined by an optical arrangement, which is accommodated upstream of the objective lens with respect to the direction of the illuminating light beam propagation towards the structure's plane, and which is shiftable between an operative position whereof being in an optical path of the light beam propagating towards the objective lens and an inoperative position thereof being outside the path of the light beam propagating towards the objective lends, the inoperative position of the optical arrangement resulting in the light beam propagation along the first optical path, and the operative position of the optical arrangement resulting in the light beam propagation along the second optical path.

2. An optical system for use in a measurement system for measuring in patterned structures, the system comprising:

an illuminator unit producing an illuminating beam of light to be directed to the structure to produce a returned light beam;
a detector unit comprising an imaging detector and a spectrophotometer detector; and
a light directing assembly for directing the illuminating beam to the structure and directing the returned beam to the detector unit, the light directing assembly comprising:
   an objective lens that focuses the illuminating light beam onto the structure's plane and collects the returned light beam and that defines a first optical path for the light beam resulting in a relatively smaller measuring area, and
   an optical arrangement, which is accommodated upstream of the objective lens with respect to the direction of the illuminating light beam propagation towards the structure's plane, and which is shiftable between an operative position thereof being in the first optical path and an inoperative position thereof being outside the first optical path, the inoperative position of the optical arrangement resulting in the light beam propagation along the first optical path, and the operative position of the optical arrangement resulting in the light beam propagation along a second optical path that provides a relatively large measuring area, as compared to that of the first optical path.

3. The system according to claim 2, wherein the optical arrangement comprises first and second spaced-apart mirrors facing each other by their reflective surfaces, the first mirror being mounted stationary aside the objective lens, and the second mirror being mounted for movement between its inoperative position being outside the optical path passing through the objective lens and an operative position being inside said optical path passing through the objective lens.

4. The system according the claim 3, comprising a beam-expanding unit accommodated in a path of the illuminating beam reflected from the first mirror.

5. The system according to claim 2, wherein the light directing assembly comprises at least two optical sub-systems, one sub-system providing the smaller measuring area, and at least one other sub-system providing the larger measuring area.

6. The system according to claim 5, wherein the illuminator unit produces at least one additional illumination beam, the at least two illuminating beams being directed through the at least two optical sub-systems respectively.

7. The system according to claim 5, wherein the detector unit comprises at least one additional imaging detector, the at least two imaging detectors being associated with the at least two optical sub-systems, respectively.

8. The system according to claim 5, wherein the detector unit comprises at least one additional spectrophotometer detector, the at least two spectrophotometer detectors being associated with the at least two optical sub-systems, respectively.

9. A method for controlling a process applied to a patterned structure progressing on a production line, the method comprising selectively applying spectrophotometric measurements to at least one predetermined site on the structure with measuring areas of different sizes, the selective applying of the measurements comprising:
   applying the measurements to the structure to be processed with a relatively large measuring area, obtaining information about a top layer thickness parameter of the structure to be processed, and generating first data indicative thereof;

applying the optical measurements to said structure after being processed with a relatively small measuring area, obtaining information about the top layer thickness parameter of the structure to be processed, and generating second data indicative thereof;

analyzing said first and second data to provide a close loop control of the process for similar type structures.

10. A method for controlling a process applied to a patterned structure progressing on a production line, the method comprising selectively applying spectrophotometric measurements to at least one predetermined site on the structure with measuring areas of different sizes, the selective applying of the measurements comprising:

applying the optical measurements to the structure after being processed with a relatively small measuring area and obtaining first data associated with a top layer thickness parameter of the processed structure;

applying the optical measurements to the same structure with a relatively large measuring area, obtaining second data indicative of the top layer thickness parameter of the structure, and using the first data to interpret the second data and thereby determine the top layer thickness parameter.

* * * * *